(12) United States Patent
Park et al.

(10) Patent No.: US 9,013,347 B2
(45) Date of Patent: Apr. 21, 2015

(54) RADAR APPARATUS

(75) Inventors: Pil Jae Park, Daejeon (KR); Cheon Soo Kim, Daejeon (KR); Hyun Kyu Yu, Daejeon (KR); Min Park, Daejeon (KR); Ik Soo Eo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 482 days.

(21) Appl. No.: 13/445,102

(22) Filed: Apr. 12, 2012

(65) Prior Publication Data
US 2012/0262330 A1    Oct. 18, 2012

(30) Foreign Application Priority Data

Apr. 12, 2011   (KR) .................... 10-2011-0033942
Mar. 15, 2012   (KR) .................... 10-2012-0026571

(51) Int. Cl.
*G01S 13/74* (2006.01)
*G01S 13/08* (2006.01)
*G01S 13/58* (2006.01)
*G01S 13/32* (2006.01)
*G01S 7/00* (2006.01)

(52) U.S. Cl.
CPC .............. *G01S 13/325* (2013.01); *G01S 7/003* (2013.01); *G01S 13/584* (2013.01)

(58) Field of Classification Search
CPC . G06K 7/10059; G01S 13/765; G01S 13/878; G01S 13/84; G01S 7/003; G01S 13/784; G01S 13/325; G01S 13/9303; G01S 13/584; G01S 13/74; G01S 13/781; G01S 13/91; G01S 13/26; G01S 13/288

USPC ......... 342/29–51, 70–72, 104, 107–109, 115, 342/118, 134–146

See application file for complete search history.

(56) References Cited

U.S. PATENT DOCUMENTS

| | | | | |
|---|---|---|---|---|
| 4,618,863 A * | 10/1986 | Collins | ........................ | 342/194 |
| 4,620,192 A * | 10/1986 | Collins | ........................ | 342/128 |
| 5,293,168 A * | 3/1994 | Faulkner | ...................... | 342/145 |
| 5,321,409 A * | 6/1994 | Walker | ........................ | 342/202 |
| 5,389,932 A * | 2/1995 | Ota et al. | ...................... | 342/189 |
| 5,515,056 A * | 5/1996 | Henderson et al. | ........... | 342/125 |
| 5,539,408 A * | 7/1996 | Moreira et al. | ............. | 342/25 B |
| 5,550,549 A * | 8/1996 | Procter et al. | .................. | 342/47 |
| 5,793,327 A * | 8/1998 | Carnes et al. | ................. | 342/135 |
| 5,892,477 A * | 4/1999 | Wehling | ........................ | 342/18 |
| 5,999,119 A * | 12/1999 | Carnes et al. | ................. | 342/135 |
| 6,507,311 B2 * | 1/2003 | Sauer | ............................. | 342/70 |
| 6,720,920 B2 * | 4/2004 | Breed et al. | .................... | 342/386 |
| 6,822,605 B2 * | 11/2004 | Brosche | ........................ | 342/130 |
| 7,023,377 B2 * | 4/2006 | Axelsson | ...................... | 342/109 |
| 7,209,469 B2 * | 4/2007 | Runkle et al. | ................. | 370/347 |

(Continued)

OTHER PUBLICATIONS

Machowski et al., Performance indications of a novel chaotic-signal FM-CW Radar for multi-user applications, The Institution of Electrical Engineers, 2002, pp. 474-477.

(Continued)

*Primary Examiner* — Peter Bythrow
(74) *Attorney, Agent, or Firm* — Rabin & Berdo, P.C.

(57) ABSTRACT

An embodiment of the present invention relates to a radar apparatus, wherein a distance to a target and a velocity of the target are measured by transmitting a digitally modulated transmitting signal using a digital code and receiving and demodulating an echo signal returned due to reflection of the transmitting signal from the target.

14 Claims, 6 Drawing Sheets

(56) References Cited

U.S. PATENT DOCUMENTS

| | | | |
|---|---|---|---|
| 7,414,567 B2* | 8/2008 | Zhang et al. | 342/29 |
| 7,423,576 B2* | 9/2008 | Sahinoglu et al. | 342/27 |
| 7,994,969 B2* | 8/2011 | Van Caekenberghe et al. | 342/200 |
| 7,995,644 B2* | 8/2011 | Sahinoglu et al. | 375/221 |
| 8,081,105 B2* | 12/2011 | Tigrek et al. | 342/105 |
| 8,184,038 B2* | 5/2012 | Ekbal et al. | 342/109 |
| 8,279,111 B2* | 10/2012 | Zhen et al. | 342/125 |
| 8,441,393 B2* | 5/2013 | Strauch et al. | 342/60 |
| 8,576,116 B2* | 11/2013 | Matsuo | 342/145 |
| 8,659,477 B2* | 2/2014 | Fukagawa et al. | 342/458 |
| 2003/0222817 A1* | 12/2003 | Gfeller et al. | 342/375 |
| 2004/0178948 A1* | 9/2004 | Axelsson | 342/118 |
| 2008/0018521 A1* | 1/2008 | Sahinoglu et al. | 342/27 |
| 2008/0150784 A1* | 6/2008 | Zhang et al. | 342/30 |
| 2009/0322587 A1* | 12/2009 | Stayton | 342/37 |
| 2010/0045508 A1* | 2/2010 | Ekbal et al. | 342/145 |
| 2010/0079329 A1* | 4/2010 | Stayton | 342/37 |
| 2010/0231435 A1* | 9/2010 | Zhen et al. | 342/47 |
| 2011/0001653 A1* | 1/2011 | Troxel | 342/30 |
| 2011/0193739 A1* | 8/2011 | Strauch et al. | 342/146 |

OTHER PUBLICATIONS

Kim Sang-Dong, Lee Jong-Hun, Jung Woo-Young; "The ultra-wideband radar for vehicle system booting method and ultra-wideband radar system for vehicle"; KIPO; Apr. 8, 2010; Republic of Korea; pp. 1-13.

* cited by examiner

Fig. 2b

EXAMPLE OF DISTANCE CODE [ x0  x1  x2  x3  x4 ····· ]

| TIME | DISTANCE (RANGE) | VELOCITY |
|---|---|---|
| ⋮ | ⋮ | ⋮ |
| $t_1$ | $r_1$ | $v_1$ |
| $t_2$ | $r_2$ | $v_2$ |
| $t_3$ | $r_3$ | $v_3$ |
| $t_4$ | $r_4$ | $v_4$ |
| $t_5$ | $r_5$ | $v_5$ |
| $t_6$ | $r_6$ | $v_6$ |
| $t_7$ | $r_7$ | $v_7$ |
| $t_8$ | $r_8$ | $v_8$ |
| ⋮ | ⋮ | ⋮ |

RADAR APPARATUS

CROSS-REFERENCES TO RELATED APPLICATIONS

The present application claims priority under 35 U.S.C 119(a) to Korean Application No. 10-2011-0033942, filed on Apr. 12, 2011, in the Korean Intellectual Property Office and Korean Application No. 10-2012-0026571, filed on Mar. 15, 2012, in the Korean Intellectual Property Office, which are incorporated herein by reference in its entirety set forth in full.

BACKGROUND

Exemplary embodiments of the present invention relates to a radar apparatus for measuring a distance to a target and a velocity of a target, and more particularly, to a radar apparatus which features improved reliability than an analog scheme using a digital modulation and demodulation technology and is easily implemented with an integrated circuit technology.

Background Art of the present invention is disclosed in Korean Patent Laid-Open Publication No. 2009-0067990 (Published in Jun. 25, 2009).

Recently, as a demand for a short range high resolution radar is increased in a millimeter/sub-millimeter band, a study thereof has been continued. The high resolution radar system capable of discriminating or decomposing a distance between proximity objects has been variously used as industrial, military applications, and the like, and has been mainly used for a radar system for a vehicle in a real life. The radar system for a vehicle, which is an essential technology for implementing an intelligent traffic system, may mean a safety driving system of a vehicle developed so as to previously prevent accidents occurring due to poor weather conditions or carelessness of a driver by sensing motions of other vehicles or objects that move or stop.

A radar in a frequency modulation continuous wave (FMCW) scheme in accordance with the related art frequency-modulates and transmits a transmitting signal into a type (for example, a triangular wave) of linearly increasing and reducing a frequency of the transmitting signal over time. In the related art, a receiver receives an echo signal returned due to reflection of the transmitting signal from the target prior to a predetermined time to obtain a beat frequency corresponding to a difference in frequencies between the transmitting signal and the echo signal and obtains position and velocity information of a target using the obtained beat frequency. An example of the FMCW scheme may include an analog modulation scheme as a scheme for obtaining the beat frequency. However, the analog modulation scheme has lower reliability than a digital scheme, which is not suitable to use developed integrated circuit technologies. Further, when a number of radars simultaneously use a frequency in the same band, mutual interference occurs in signals, which may lead to degradation in receiving performance.

SUMMARY

An embodiment of the present invention is directed to a radar apparatus for measuring a distance to a target and a velocity of a target, and more particularly, to a radar apparatus which has more improved reliability than an analog scheme using a digital modulation and demodulation technology, is easily implemented with an integrated circuit technology, and has an effect of relatively small interference.

An embodiment of the present invention relates to a radar apparatus, wherein a distance to a target and a velocity of the target are measured by transmitting a digitally modulated transmitting signal using a digital code and receiving and demodulating an echo signal returned due to reflection of the transmitting signal from the target.

The digitally modulated transmitting signal may be configured to include a plurality of packets including at least one segment and the plurality of packets may be sequentially transmitted.

Each packet included in the digitally modulated transmitting signal may include at least one of a preamble for synchronization of signals and a distance code for measuring the distance, wherein the distance codes included in each packet may have correlation with one another.

The correlation may indicate a degree of a code space between the distance codes included in each packet.

A lead time between a first time and a current time may be calculated based on the correlation between the distance codes included in the echo signals returned due to the reflection of the transmitting signal transmitted at the first time from the target and the distance codes included in the transmitting signals at the current time and the distance to the target may be calculated based on the calculated lead time.

Each packet may further include a data segment for communicating data between different radar apparatuses.

The velocity of the target may be calculated based on a change in a Doppler frequency of the echo signals reflected and returned by the target or may be calculated based on a change in the distance to the target per a time interval by measuring the distance to the target at a predefined time interval.

The transmitting signal may include unique identification codes for identifying each radar apparatus and each radar apparatus may identify its own echo signal by the identification codes.

The radar apparatus may include: a transmitter that converts a digital modulation signal generated by a digital signal processor into an analog signal and transmits the transmitting signal generated by converting the analog signal into a carrier frequency through a transmit antenna; a receiver that receives and digitally converts the echo signals reflected and returned from the target; and a digital signal processor that generates the digital modulation signal using a digital code and demodulates and digitally signal-processes the digitally converted echo signal.

The transmitter may include: a digital-analog converter that converts the digital modulation signal into the analog signal in a baseband; an oscillator that generates the carrier signal; a transmit mixer that uses the carrier signal to convert the analog signal in the baseband into an analog signal of which the central frequency is the carrier frequency by using the carrier signal; and a power amplifier power-amplifying an output signal of the transmit mixer to generate the transmitting signal.

The receiver may include: a low noise amplifier amplifies the echo signals received through a receive antenna; a mixer that converts the output signal of the low-noise amplifier into the analog signal in the baseband; and an analog-digital converter that converts the output signal of the mixer into the digital signal.

BRIEF DESCRIPTION OF THE DRAWINGS

The above and other aspects, features and other advantages will be more clearly understood from the following detailed description taken in conjunction with the accompanying drawings, in which:

FIG. 2A is a diagram illustrating a configuration of a transmitting signal used in the radar apparatus in accordance with the embodiment of the present invention and FIG. 2B is a diagram illustrating an example of distance codes included in the transmitting signal;

FIG. 4 is a table for describing another example of a method for allowing the radar apparatus in accordance with the embodiment of the present invention to measure a velocity of a target.

DESCRIPTION OF SPECIFIC EMBODIMENTS

Figure 1:
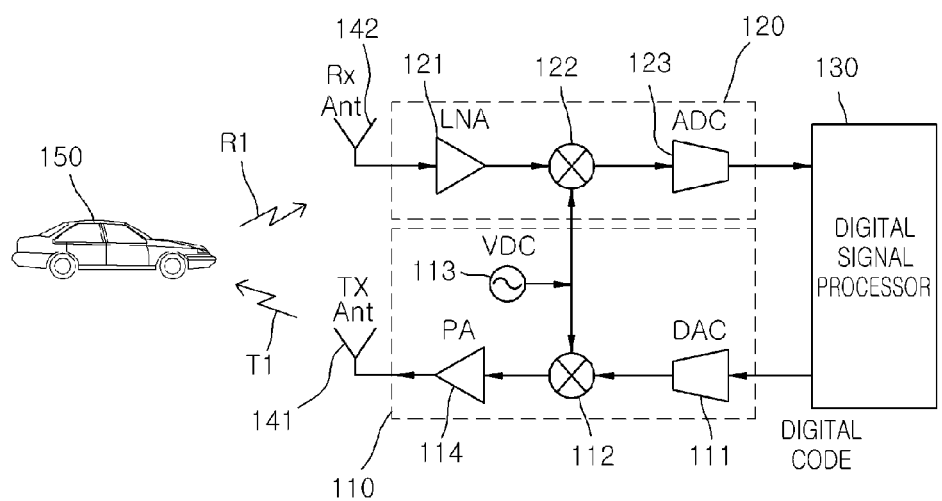
FIG. 1 is a diagram illustrating a configuration of a radar apparatus in accordance with an embodiment of the present invention.

Hereinafter, an apparatus and a method for inputting information based on events in accordance with an embodiment of the present invention will be described with reference to the accompanying drawings. In describing the embodiment, a thickness of lines illustrated in the drawings, a size of components, etc., may be exaggeratedly illustrated for clearness and convenience of explanation. In addition, terms described to be below are terms defined in consideration of functions in the present invention, which may be changed according to the intention or practice of a user or an operator. Therefore, these terms will be defined based on contents throughout the specification.

Figure 2A:
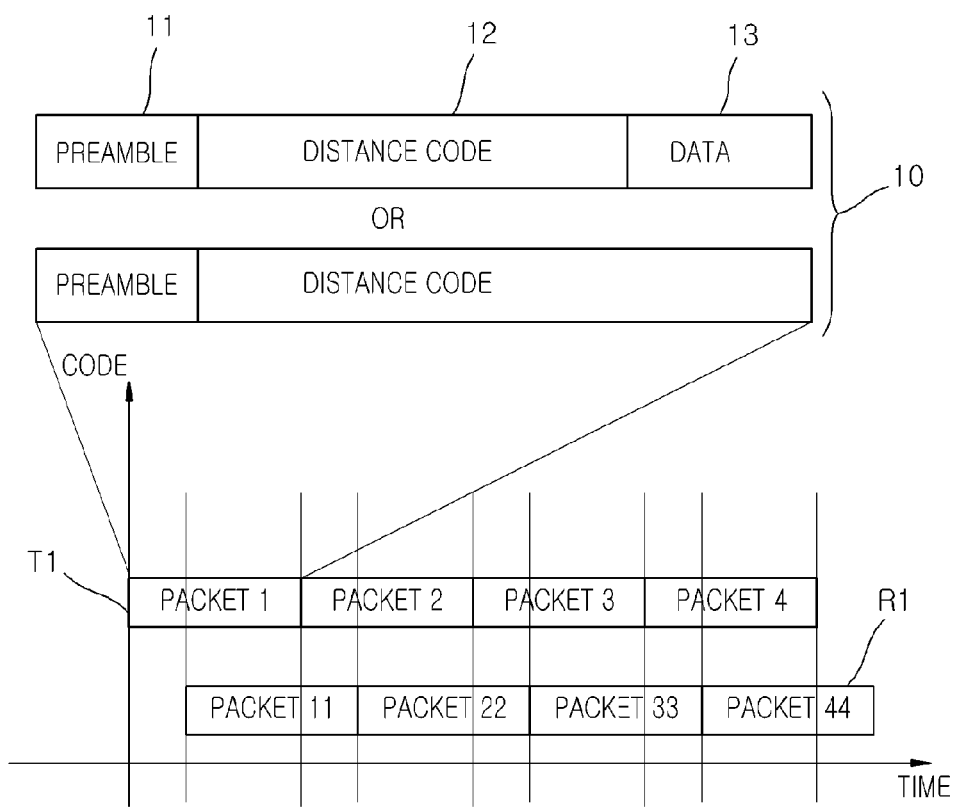

FIG. 1 is a diagram illustrating a configuration of a radar apparatus in accordance with an embodiment of the present invention, FIG. 2A is a diagram illustrating a configuration of a transmitting signal used in the radar apparatus in accordance with the embodiment of the present invention, and FIG. 2B is a diagram illustrating an example of distance codes included in the transmitting signal. Exemplary embodiments of the present invention will be described with reference to the accompanying drawings.

As illustrated in FIG. 1, the radar apparatus in accordance with an embodiment of the present invention transmits a transmitting signal T1 that is digitally modulated using a digital code and receives and demodulates an echo signal R1 returned due to reflection of the transmitting signal T1 from a target 150 to measure a distance to the target 150 and a velocity of the target 150.

The radar apparatus in accordance with the embodiment of the present invention may be configured to include: a transmitter 110 that converts a digital modulation signal generated by a digital signal processor 130 into an analog signal and transmits the transmitting signal T1 generated by converting the analog signal into a carrier frequency through a transmit antenna 141; a receiver 120 that receives and digitally converts the echo signal R1 reflected and returned from the target 150; and a digital signal processor 130 that generates the digital modulation signal using a digital code and demodulates and digitally signal-processes the digitally converted echo signal R1.

The transmitter 110 may be configured to include: a digital-analog converter 111 that converts the digital modulation signal into an analog signal in a baseband; an oscillator 1133 that generates a carrier signal; a transmit mixer 112 that coverts the analog signal in the baseband into the analog signal of which the central frequency is a carrier frequency by using the carrier signal; and a power amplifier 114 that power-amplifies an output signal of the transmit mixer 112 to generate the transmitting signal.

The receiver 120 may be configured to include: a low-noise amplifier 121 that amplifies the echo signal R1 received through the receiving antenna 142; a mixer 122 that converts the output signal of the low-noise amplifier 121 into the analog signal in the baseband; and an analog-digital converter 123 that converts the output signal of the mixer 122 into the digital signal.

The radar apparatus in accordance with the embodiment of the present invention is not limited to the above-mentioned components and may further include or omit some components in accordance with the embodiment of the present invention. Embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art.

Operation and action of the embodiment of the present invention configured as described above will be described in detail with reference to FIGS. 1 to 5.

The digital signal processor 130 uses the digital code to generate the digital modulation signal and demodulates the digitally converted echo signal R1 and performs digital signal processing.

In the transmitter 110, the digital-analog converter 111 converts and outputs the digital modulation signal generated by the digital signal processor 130 into the analog signal in the base band. The oscillator 113 generates the carrier signal and the transmit mixer 112 converts and outputs the analog signal in the baseband into the analog signal of which the central frequency is the carrier frequency by using the carrier signal. As a result, the power amplifier 114 power-amplifies the output signal of the transmit mixer 112 to generate the transmitting signal T1, wherein the transmitting signal T1 is transmitted through the transmit antenna 141.

Then, when the echo signal R1 that is a signal returned due to the reflection of the transmitting signal T1 from the target 150 is received in the receiving antenna 142, the low-noise amplifier 121 in the receiver 120 amplifies and outputs the received echo signal R1 and the mixer 122 converts the output signal of the low-noise amplifier 121 into the analog signal in the baseband by using the oscillator 113. As a result, the analog-digital converter 123 converts the output signal of the mixer 122 into the digital signal and outputs the converted digital signal to the digital signal processor 130 and the digital signal processor 130 performs the digital signal processing on the output digital signal to calculate information such as the distance to the target 150 and the moving velocity of the target 150.

The process of measuring the distance and the velocity that are performed by the radar apparatus in accordance with the embodiment of the present invention will be described below in detail.

Distance Measurement

In the above description, the transmitting signal T1 transmitted by the transmitter 110 may be configured to include a plurality of packets. The radar apparatus in accordance with the embodiment of the present invention configures the transmitting signal T1 into the plurality of packets and transmits the plurality of packets, thereby accurately acquiring the position and velocity information of multiple targets. In addition, the radar apparatus in accordance with the embodiment of the present invention is more advantageous in detecting the multiple targets than the radar in the FMCW scheme of the related art. In the radar in the FMCW scheme in accordance with the related art, when the number of frequency linear change slopes of the transmitting signal is smaller than the number of targets, there is a problem in that it is not possible to differentiate a ghost target. This is due to the conversion of the position and velocity information of the target into a beat frequency in the FMCW scheme. On the other hand, the radar apparatus in accordance with the embodiment of the present invention can independently obtain the position of the target by the operation of the digital code, which is more advantageous in detecting the multiple targets.

FIG. 2A is a diagram illustrating a configuration of a transmitting signal used in the radar apparatus in accordance with the embodiment of the present invention and FIG. 2B is a diagram illustrating an example of distance codes included in the transmitting signal. As illustrated in FIG. 2A, the transmitting signal T1 that is generated and transmitted by the transmitter 110 is configured to include a plurality of packets packet 1, packet 2, packet 3, packet 4, . . . including at least one segment 11, 12, and 13, wherein the plurality of packets packet 1, packet 2, packet 3, packet 4, . . . are sequentially transmitted. In this case, each packet 10 may be configured to include at least one of preambles 11 for synchronizing signals, distance codes 12 for measuring a distance, and a data segment 13 for communicating data between different radar apparatuses. That is, as illustrated in FIG. 2A, each packet 10 may be configured to include the preamble 11, the distance codes 12, and the data segment 13, may be configured to include the preambles 11 and the distance codes 12, or even may be configured to include only the preambles 11. Here, each segment may be configured by various schemes.

As illustrated in FIG. 2A, the packet 10 included in the transmitting signal T1 may be configured to include different kinds of segments and a length of the packet may be different from each other. The configuration of the packet of FIG. 2A is an example to help understanding of description. The radar apparatus may be implemented as a synchronous and asynchronous system using a global reference (for example, a GPS global positioning system). In the case of the asynchronous system, each packet 10 may be configured to include the preambles 11 for searching synchronization of signals, the distance codes 12 for obtaining the distance and velocity information by operating the echo signal R1 returned from the target and the current transmitting signal T1, and the data segment 13 for communicating between the radars, or the like.

Meanwhile, there is correlation between the distance codes 12 included in each packet 10. In this case, the correlation represents a degree of a code space between the distance codes 12 included in each packet packet 1, packet 2, packet 3, packet 4, . . . , that is, a degree spaced between the codes that may be calculated through a mathematical operation (digital logical operation) For example, as illustrated in FIG. 2B, the distance codes 12 may be represented by $x_0, x_1, x_2, x_3, \ldots$ that ire configured of 8 bits. In this case, $x_3$ and $x_6$ (or $x_6$ and $x_9$) show a difference in 3 bits that is proportional to the distance of the code and $x_3$ and $x_9$ show a difference in 6 bits. Therefore, when the transmitting signal T1 is modulated using the distance codes 12 having the characteristics, $\Delta t$ that is the time required for the transmitting signal T1 to be returned from the target 150 can be calculated by comparing the distance codes 12 included in the echo signal R1 returned from a target and received to the receiving antenna 142 after the transmitting signal T1 is transmitted prior to a predetermined time $\Delta t$ with the distance codes 12 included in the currently transmitted transmitting signal and operating the difference therebetween. Further, a distance S to the target 150 may be calculated based on the calculated $\Delta t$ according to the following Equation 1.

$$S = (\text{velocity of light}) \times \Delta t \times 1/2 \qquad [\text{Equation 1}]$$

A section difference between the distance codes 12 may be easily identified by the logical operation. Alternatively, the length and the configuration scheme of the distance codes 12 may be implemented by various schemes. FIG. 2B illustrates an example for helping understanding of describing, but the embodiment of the present invention is not limited to the above-mentioned scheme. As another example thereof, when a pseudo noise (PN) code is transmitted, the position of the target can be estimated by a method for operating correlation between the echo signal R1 returned from the target due to the reflection of the transmitting signal from the target prior to the $\Delta t$ and received to the receiver and the PN code of the transmitter.

As described above, the radar apparatus in accordance with the embodiment of the resent invention generates and transmits the transmitting signal T1 configured to include the plurality of packets 10 including the distance codes 12 and may measure the distance to the target 150 by comparing the correlation of the distance codes 12 between the reflected echo signal R1 and the current transmitting signal T1.

Velocity Measurement

In accordance with the embodiment of the present invention, when the target 150 is moving, the velocity of the moving target 150 is calculated based on a change in a Doppler frequency of the echo signal R1 reflected and returned from the target 150 or may be calculated based on a change in the distance to the target 150 per a time interval by measuring the distance to the target 150 at a predefined time interval.

Figure 3:
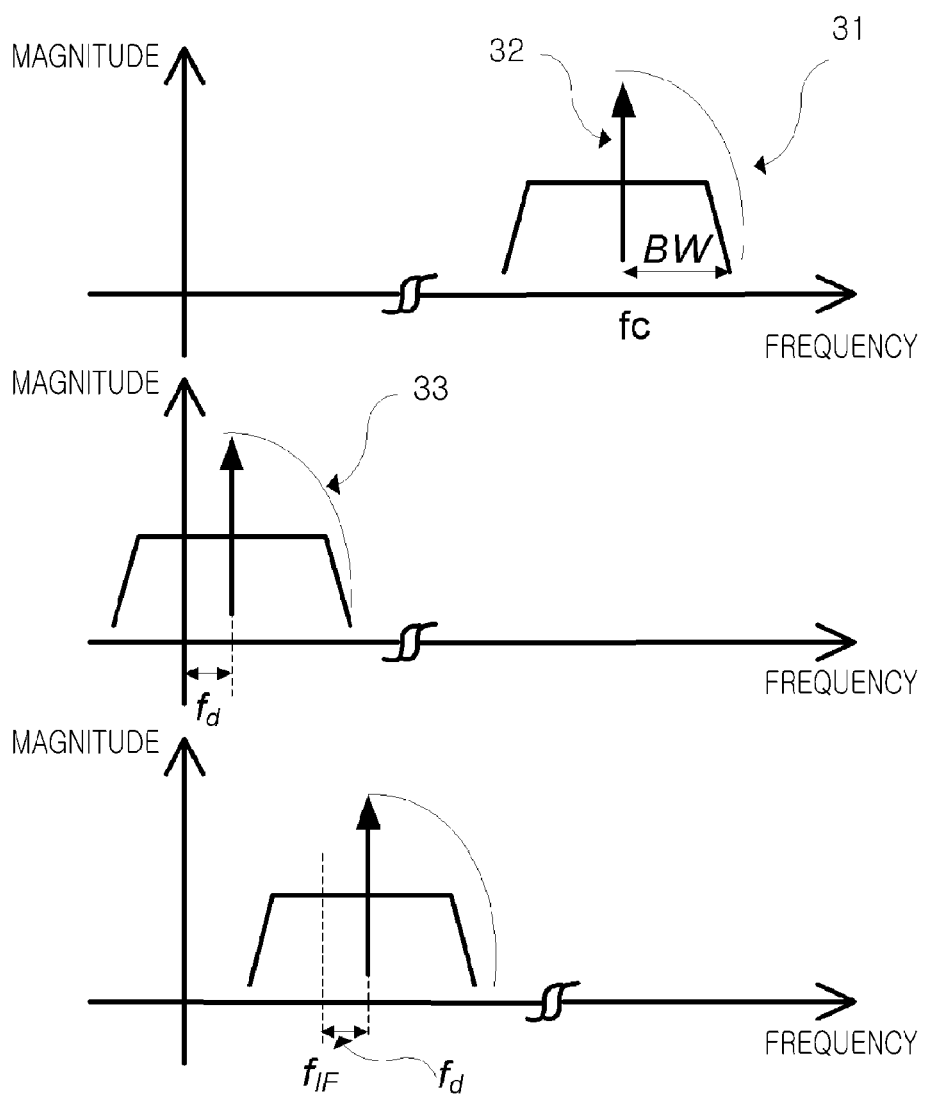
FIG. 3 is a waveform diagram for describing an example of a method for allowing the radar apparatus in accordance with the embodiment of the present invention to measure a velocity of a target.

First, the radar apparatus in accordance with the embodiment of the present invention may calculate the velocity of the target 150 based on the change in the Doppler frequency of the echo signal R1. FIG. 3 is a waveform diagram for describing an example of a method for allowing the radar apparatus in accordance with the embodiment of the present invention to measure a velocity of a target. As illustrated in FIG. 3, when the transmitting signal T1 is returned as the echo signal R1 by being reflected from the target 150 that is moving at relative velocity, compared with the vehicle to which the radar apparatus is attached, the echo signal R1 is changed as much as the Doppler frequency at the transmitting frequency. Since the change value is proportional to the relative velocity, the relative velocity of the target 150 may be obtained by using the change value. Further, information regarding the absolute velocity of the target 150 may be obtained by detecting the velocity of the vehicle to which the radar apparatus is attached.

As illustrated in FIG. 3, a frequency axis of the digitally modulated transmitting signal T1 may be shown by a signal 31 having a bandwidth BW based on a carrier frequency $f_c$. As illustrated in FIG. 1, the digitally modulated baseband signal is transmitted while being frequency-up converted. In this case, a carrier signal 32 is used, which is a single-tone sinusoidal signal having the carrier frequency $f_c$. Reviewing the frequency axis, like reference numeral 31, the carrier frequency is modulated and thus, has a larger magnitude than that of the signal having a bandwidth. When the echo signal R1 reflected and returned from the target 150 by being transmitted using the carrier signal is subjected to down conversion by using the single-tone sinusoidal signal having the carrier frequency, a waveform like a signal 33 can be obtained and the carrier signal can receive a waveform that is changed as much as $f_d$ by Doppler frequency conversion. The relative velocity information of the target can be obtained from the $f_d$ information. At the time of performing the down conversion of the received signal, the $f_d$ information can be received like a case of an $f_{IF}$ frequency offset and thus, the relative velocity information of the target 150 can be obtained. As such, the radar apparatus in accordance with the embodiment of the present invention may calculate the velocity of the target 150 based on the change in the Doppler frequency of the echo signal R1.

Further, the radar apparatus in accordance with the embodiment of the present invention may calculate the velocity of the target 150 based on the change in the distance to the target 150 per the time interval by measuring the distance to the target 150 at a predefined time interval, which corresponds to a method for using distance codes 12. As described above, the radar apparatus in accordance with the embodiment of the present invention may measure the distance to the target 150 by comparing the correlation of the distance codes 12 between the reflected echo signal R1 and the current transmitting signal T1. The positions of the target 150 at each time $t_1, t_2, t_3, \ldots$ are calculated by performing the operations at a constant time interval or a non-constant time interval as illustrated in FIG. 4. Further, the distance (range) to the target 150 can be obtained at each time step and the velocity of the target 150 can be obtained by obtaining the change with respect to time of a distance from the measured distance. In other words, the position of the target 150 and the velocity of the target can be measured by receiving and demodulating the distance codes 12 consecutively transmitted.

Figure 5:
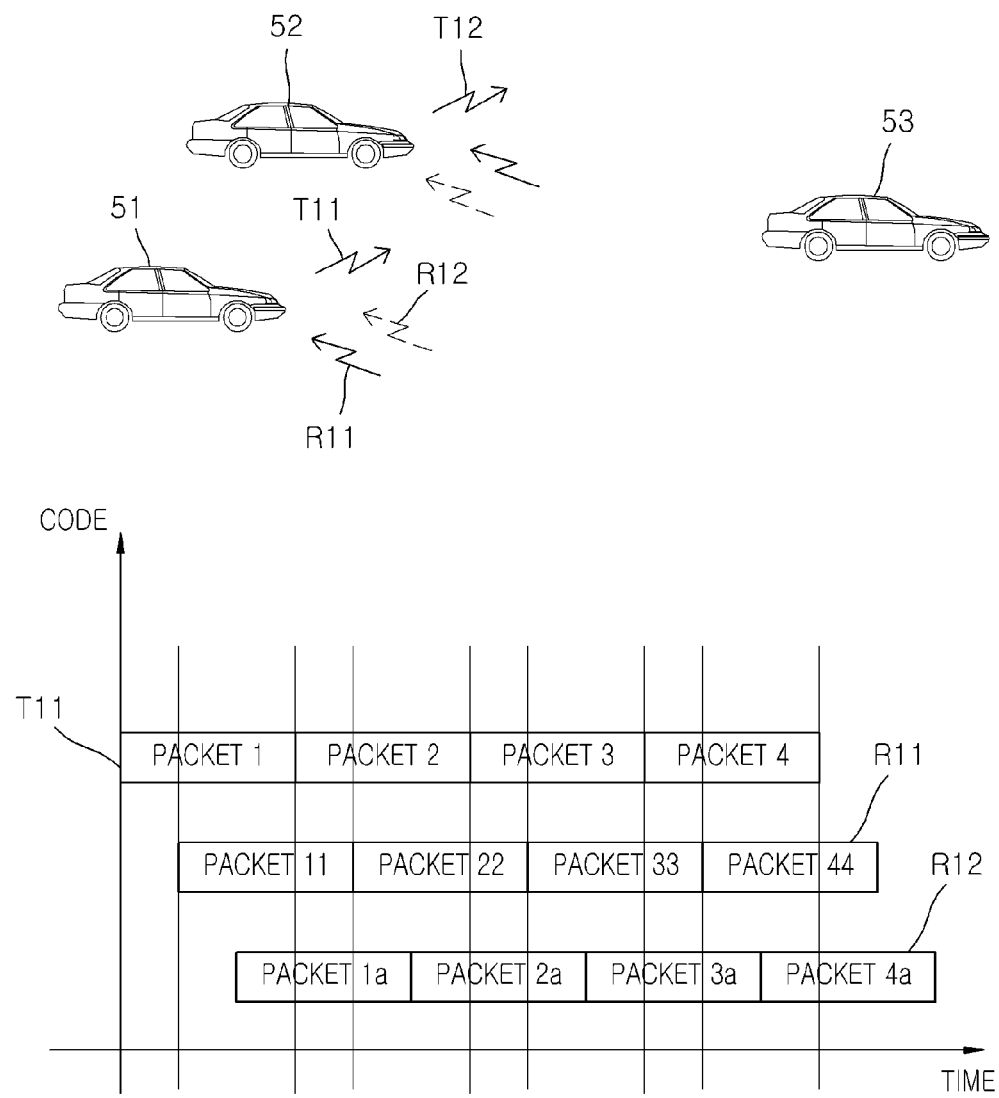
FIG. 5 is a conceptual diagram for describing an operation of a plurality of radar apparatuses mounted in each vehicle.

FIG. 5 is a conceptual diagram for describing an operation of a plurality of radar apparatuses mounted in each vehicle. The radar apparatus in accordance with the embodiment of the present invention is mounted in vehicles 51 to 53. The vehicle 51 transmits a transmitting signal T11 that is modulated by the digital modulation scheme in accordance with the embodiment of the present invention. The transmitting signal T11 is configured in a plurality of packet types and may be demodulated as unique identification codes for each vehicle. Further, some or all of the packets of the transmitting signal T11 may be demodulated with a code commonly allocated for data communication, wherein the code information is recognized by all the vehicles. For helping understanding of the embodiment of the present invention, it is assumed that an echo signal R11 by a signal transmitted from the vehicle 51 and an echo signal R12 by a signal T12 transmitted from the vehicle 52 are received simultaneously. In the embodiment of the present invention, the modulated signal is transmitted by using the identification codes among the vehicles and therefore, the echo signal by the transmitting signal may be identified and demodulated. Therefore, when the echo signals R11 and R12 are demodulated by using the transmitting signal T11, the information regarding the distance to the vehicle 53 and the velocity of the vehicle 53 can be obtained. Further, when the change in the Doppler frequency of the carrier signal of the transmitting signal T11 is measured, the information regarding the velocity of the vehicle 53 can be obtained. In addition, since the packets or some of the packets for data communication are present in the transmitting signal T11 of the vehicle, the information is demodulated by using the previously known code, thereby implementing the communication between two vehicles 51 and 52. The data code can provide an autonomous travelling unit by allowing the vehicles to recognize the information regarding the surrounding vehicles.

As such, the transmitting signal T1 generated and transmitted in the radar apparatus in accordance with the embodiment of the present invention may include the unique identification codes for identifying each radar apparatus and each radar apparatus can identify its own echo signal by the identification codes. Therefore, when there is a plurality of radar apparatuses in accordance with the embodiment of the present invention, each radar apparatus may be less affected by the interference among the plurality of transmitting signals, thereby accurately measuring the position and velocity of the target 150.

As described above, the radar apparatus in accordance with the embodiment of the present invention can improve reliability than the analog scheme using the digital modulation and demodulation technology, be easily implemented with the integrated circuit technology, and have the effect of relatively small interference, while accurately measuring a distance to a target and a speed of a target.

The radar apparatus in accordance with the embodiment of the present invention can improve reliability than the analog scheme using the digital modulation and demodulation technology, be easily implemented with the integrated circuit technology, and have the effect of relatively small interference, while accurately measuring a distance to a target and a velocity of a target.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A radar apparatus, comprising:
a transmitter configured to transmit a digitally modulated transmitting signal;
a receiver configured to receive an echo signal outputted by the transmitter and reflected by an object; and
a digital signal processor configured to demodulate the echo signal to measure a distance to the object,
wherein the digitally modulated transmitting signal is configured to include a plurality of packets, each packet including a distance code for measuring the distance, the distance codes included in each packet having correlation with one another, and
wherein the correlation indicates a degree of a code space between the distance codes included in each packet.

2. The radar apparatus of claim 1, wherein the each packet further includes at least one segment and the plurality of packets are sequentially transmitted.

3. The radar apparatus of claim 2, wherein each packet included in the digitally modulated transmitting signal further includes a preamble for synchronization of signals.

4. The radar apparatus of claim 3, wherein the digital signal processor calculates a time interval between the time at transmitting the signal and a current time based on the correlation between distance codes included in the echo signal of the transmitting signal and the distance codes included in the transmitting signal at the current time, and
calculates the distance to the object based on the calculated time interval.

5. The radar apparatus of claim 3, wherein each packet further includes a data segment for communicating data between different radar apparatuses.

6. The radar apparatus of claim 1, wherein the digital signal processor further calculates a velocity of the object based on a change in a Doppler frequency of the echo signals or based on a change in the distance to the object per a time interval by measuring the distance to the object at a predefined time interval.

7. The radar apparatus of claim 1, wherein the transmitting signal includes unique identification codes for identifying each radar apparatus and each radar apparatus identifies its own echo signal by the identification codes.

8. The radar apparatus of claim 1, wherein the transmitter converts a digital modulation signal generated by the digital signal processor into an analog signal and transmits the signal through a transmit antenna by up-converting the signal to a carrier frequency.

9. The radar apparatus of claim 8, wherein the transmitter includes:
a digital-to-analog converter configured to convert the digitally modulated signal into the analog signal in a baseband;
an oscillator configured to generate the carrier signal;
a transmit mixer configured to convert the analog signal in the baseband into an analog signal of which the central frequency is the carrier frequency by using the carrier signal; and
a power amplifier configured to generate the transmitting signal by amplifying an output signal of the transmit mixer.

10. The radar apparatus of claim 8, wherein the receiver includes:
a low noise amplifier configured to amplify the echo signals received through a receive antenna;
a mixer configured to convert the output signal of the low-noise amplifier into the analog signal in the baseband; and
an analog-to-digital converter configured to convert the output signal of the mixer into the digital signal.

11. The radar apparatus of claim 9, wherein each packet further includes at least one segment and the plurality of packets are sequentially transmitted.

12. The radar apparatus of claim 10, wherein each packet included in the digitally modulated transmitting signal further includes a preamble for synchronization of signals.

13. The radar apparatus of claim 12, wherein the digital signal processor calculates a time interval between the time at transmitting the signal and a current time based on the correlation between distance codes included in the echo signal of the transmitting signal at the first time and the distance codes included in the transmitting signal at the current time, and
calculates the distance to the object based on the calculated time interval.

14. The radar apparatus of claim 9, wherein the digital signal processor further calculates a velocity of the object based on a change in a Doppler frequency of the echo signals or based on a change in the distance to the object per a time interval by measuring the distance to the object at a predefined time interval.

* * * * *